Figure 1:
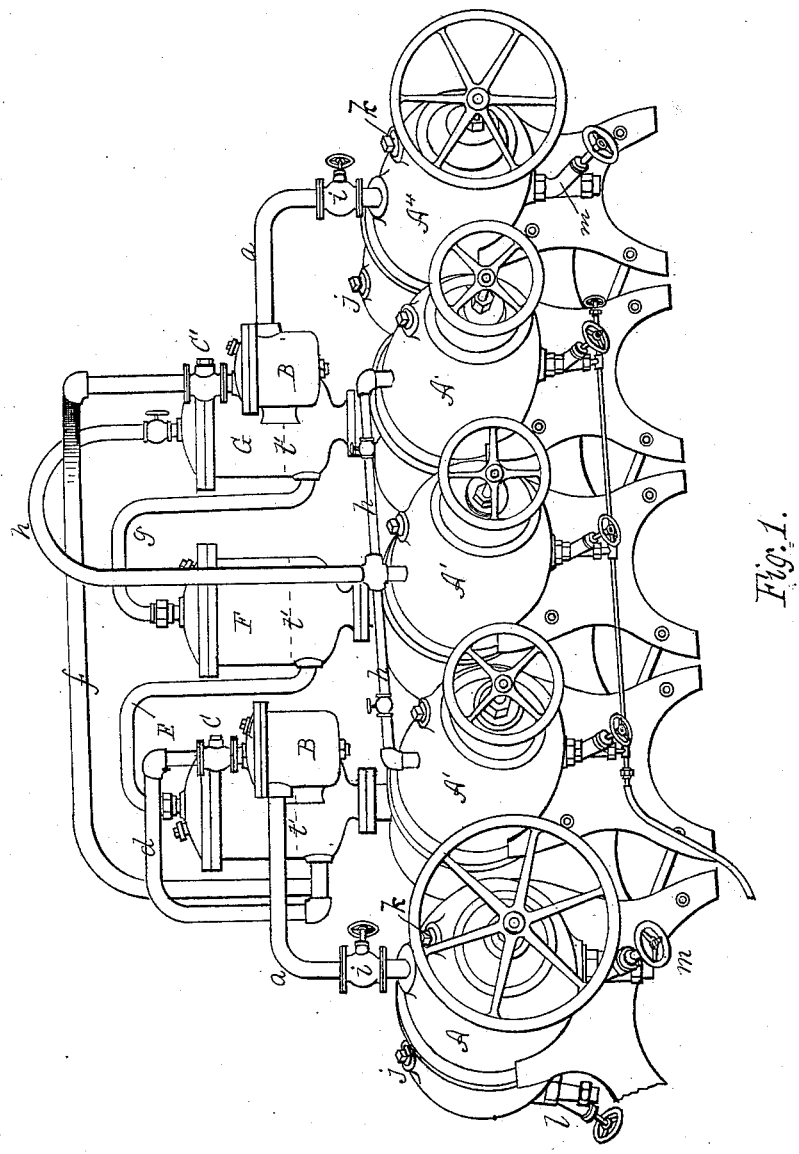

(No Model.)

L. W. PUFFER.
CARBONIC ACID GAS GENERATOR.

No. 300,008. Patented June 10, 1884.

2 Sheets—Sheet 1.

WITNESSES.
H. E. Lodge
A. F. Hayden.

INVENTOR.
Luther W. Puffer.
ATTORNEY
J. Curtis Atty (No Model.) 2 Sheets—Sheet 2.
L. W. PUFFER.
CARBONIC ACID GAS GENERATOR.
No. 300,008. Patented June 10, 1884.
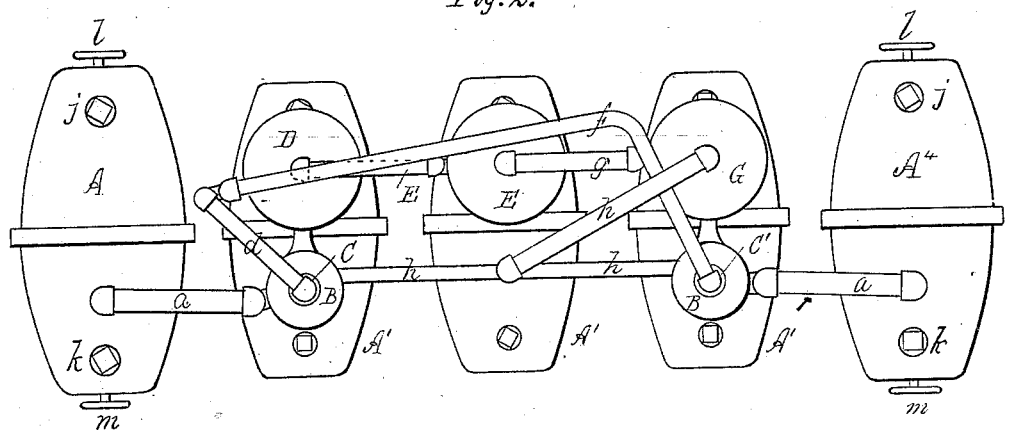
Fig. 2.
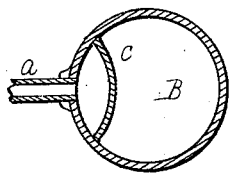
Fig. 6.
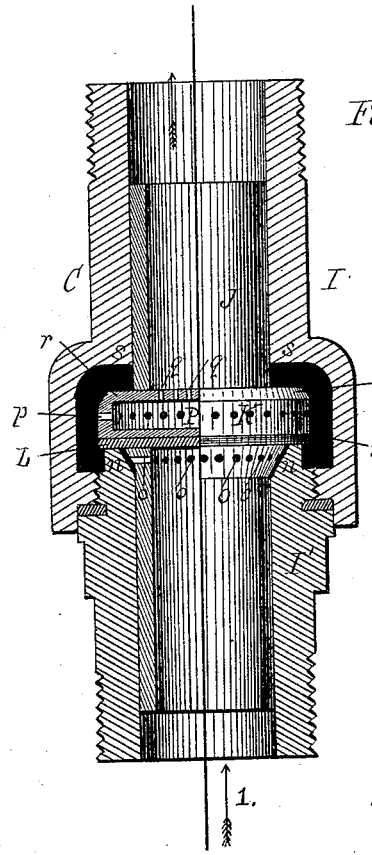
Fig. 5.
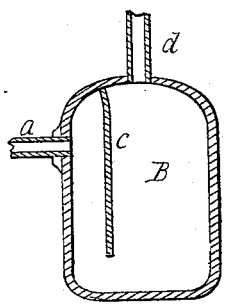
Fig. 3.
Fig. 4.
Witnesses.
H. E. Lodge
A. F. Hayden
Inventor.
Luther W. Puffer.
F. Curtis Atty.

UNITED STATES PATENT OFFICE.

LUTHER WINTHROP PUFFER, OF MEDFORD, MASSACHUSETTS.

CARBONIC-ACID-GAS GENERATOR.

SPECIFICATION forming part of Letters Patent No. 300,008, dated June 10, 1884.

Application filed January 4, 1884. (No model.)

*To all whom it may concern:*

Be it known that I, LUTHER WINTHROP PUFFER, a citizen of the United States, residing at Medford, in the county of Middlesex and State of Massachusetts, have invented certain new and useful Improvements in Carbonic-Acid-Gas Generators; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to gas-generating apparatus in which twin generators are employed to maintain a continuous supply of carbonic-acid gas for bottling or other purposes; and it consists in the employment of sediment-traps and dry purifiers disposed between the generators and the ordinary purifiers, whereby the marble-dust and acidulated water from the generators may be collected and prevented from passing over into the purifiers, which very often occurs in the ordinary method of making up apparatus of this description. From the purifiers the gas is distributed and stored in several receivers forming part of the apparatus. A further description of several automatic and other valves herein employed will be described hereinafter.

The drawings accompanying this specification represent in Figure 1 a perspective view of a carbonic-acid-gas-generating apparatus embodying my invention; and Fig. 2, a plan of the same, showing the arrangement of the distributing-pipes; Fig. 3, a vertical section, and Fig. 4 a horizontal section, of a trap and dry purifier containing my improvements; Fig. 5, a sectional elevation of the automatic valve herein more fully described, and Fig. 6 a cross-section of a diaphragm contained in the purifiers.

In these drawings, A A⁴ represent two generators, disposed in the usual manner in apparatus of this description, while A′ A′ A′ are three receivers for storing the purified carbonic-acid gas supplied by the generators, to be used for bottling or other purposes.

As I stated in my brief, the gas hitherto has been admitted from the generator or generators directly to the purifiers; hence upon opening the valve connecting the same the gas under great pressure, together with a certain amount of marble-dust and acidulated water, is carried over, which is an objectionable feature. To obviate this I have disposed, as shown in the drawings at B B, two "dry purifiers," so called. These are termed "dry," as they are supposed to contain no liquid except that carried over by the effervescing of the charged liquid in the generators. The generators are connected with these purifiers B B by pipes $a\ a$, leading into the top portion of said purifiers. These pipes $a\ a$ are supplied with the ordinary globe or steam valve of any description, and to be used only when the automatic valves C C′, to be hereinafter explained, may require to be removed for repairs or other causes.

I shall now proceed to describe the generator A on the left side of the apparatus in the drawings, and the course of the carbonic-acid gas through the trap B and the various pipes and connections to the purifiers, and thence to the receivers.

In Figs. 3 and 4 I have shown the purifiers B B as provided with a section of a bent pipe or partition, $g$, forming the trap $c$, attached to the upper portion or top of the purifier B, and extending down some distance toward the bottom and soldered to the sides thereof, in order to prevent the escape of the gas under pressure directly into the outlet-pipe $d$ at the top of B, which connects with the purifier D. It is evident that as the gas, and with it the effervescing water and the finest particles of marble-dust, come through the pipe $a$ into the purifier B, they strike against the trap or diaphragm $c$, contained in said purifier, which compels them to drop and descend to the bottom, where the water and marble-dust are deposited and retained until removed through a proper outlet when occasion requires, while the gas removed from these principal impurities rises slowly and quietly to the top of said purifier B and passes into the pipe $d$, to be conducted into the bottom of the purifier D adjacent thereto.

Upon the vertical portion of the outlet-pipe $d$, I dispose the valve C, which consists of the main body I, globular in form, and the straight cylindrical portion I′, terminating in valve-seat $n$, provided with a circular valve-head, K, tightly fitted upon a short piece of tubing, J. This piece of tubing is of smaller external diameter than the pieces I I'; hence it is free to move within them when occasion requires. The valve-head K is located centrally of the piece J, and is provided with a rubber or other suitable gasket or packing, L, which renders the valve tight and prevents gas from the generator $A^4$ returning to the generator A, or vice versa, when either is being refilled. The top part of the lower half of the tube J is slightly flared to fit the annular ledge $n$, which is formed as in ordinary valve-seats. Through this cone are bored a series of holes, $o$ $o$ $o$. The valve-head K is formed with a recess, $x$, and has two sets or series of holes, $p$ $p$, opening upon its external periphery, and a second series, $q$ $q$, upon its top face and within the diameter of the upper portion of the tube J.

I do not wish to be confined in my invention to the precise form of automatic or check valve herein described, but consider this portion of my invention to consist in the disposition of a check-valve between the generator or generators and purifiers.

The action of the valve is as follows, supposing the generator $A^4$ is to be discharged and A ready for use: As soon as the pressure in A exceeds that in $A^4$, gas passing up in the direction of the arrow 1 lifts the valve-head K, and with it the tube J, until its face $r$ abuts against the face $s$ of the valve, when its motion is stopped. The lifting of the rod J has carried the series of holes $o$ $o$ above the annular lip $n$, which, before the movement, kept them closed, and the gas passes freely through them into the valve-chamber $t$, through and into the holes $p$ $p$, or through notches, thence to the chamber or recess P, and from there into the holes $q$ $q$; hence it continues its passage until it reaches the purifier D. The valve remains in this raised or open position so long as the pressure in A exceeds that in $A^4$. When that in the latter is greater, the valve drops, the holes $o$ $o$ are closed by the lip $n$, and the valve effectually sealed by the pressure from $A^4$ upon the valve-head K, with its rubber or other packing, L, the latter resting upon the lip $n$. The position of this valve must be vertical; hence its own weight naturally throws it into its normal or closed position. The upper portion of the tube J acts in connection with the lower part to steady the valve and aid to keep it in a vertical position; or an ordinary valve may be made and used horizontally. The purifier D contains water, as is usual in such devices, and the gas broken into small globules percolates through and rises to the surface of the water and passes into and through the pipe E, leading from the top of the purifier D to the bottom of the next purifier F, and again through the pipe $g$ into the purifier G.

It will be observed that the pipes E and J pass from the top of their own purifier to the bottom of the next adjacent one. Hitherto these pipes have all been entered at the top of the purifier, in which case, under certain conditions, the gas can escape into the next adjacent purifier without passing through the water contained in its own, and the purpose of this particular purifier is nullified. Hence I have entered each inlet-pipe for every purifier at the bottom, compelling the gas to pass through the water contained therein, however small in quantity, thereby effectually and positively purifying and breaking up its large globules. The outlet-pipe is, as usual, placed at the top of the purifier. During its passage through the water in the various purifiers it has been entirely freed from any impurities contained in its large component globules when first generated—such as fine marble-dust and acidulated water—and is now considered fit to be stored in the receivers A' A' A' through proper pipes, $h$ $h$ $h$, connecting therewith, for bottling and other purposes. On the other hand, carbonic-acid gas formed in the generator $A^4$, on the right of the drawings, passes into its dry purifier B and trap $c$, where it is freed in a similar manner from the marble-dust and acidulated water by the partition $c$, (shown and described in Figs. 3 and 4,) thence led through the pipe $f$, which conducts it into the bottom of the first purifier, D, from the outside. The object of this is as follows: The gas, when just from the generator, is not purified; hence it is necessary to pass it from both generators A $A^4$ through the sediment-traps and dry purifiers into the same wet purifier D, and then continue its course onward, gradually removing the impurities at each purifier until it reaches the receivers in a proper condition for bottling. If the gas were not so conducted, all the purifiers would become more or less acidulated—as, for instance, admitting the gas from generator $A^4$ directly into its next adjacent purifier G; hence its contents would become more or less contaminated, and it would be necessary to have more purifiers to obtain the result now obtained by the arrangement herein shown.

I have shown the check-valve C between the dry purifier and its sediment-trap and the wet purifier D. This valve is so placed in the pipe that pressure from the opposite corresponding generator tends to effectually close it; and I do not intend using the valves $i$ $i$, except when the valves C C' fail to do their work and require removal or repairs.

The valves C C', arranged as above described, work automatically, as the following description will show: Suppose the generator on the right has become exhausted, and it is necessary to recharge it. The pressure is allowed to become reduced, say, to sixty pounds within it, when the other generator is put in active operation, and as soon as the pressure in the latter nearly equals that in the former the valve C will be closed against the pressure, and the generator $A^4$ may be opened, the exhausted marble-dust removed, together with the acidulated water, and replaced with fresh marble-dust, water, and acid, when the generator is again closed and ready for operation, if occasion requires.

In these drawings I have shown the generators furnished with two openings, $j\ k$, to allow it to be opened either at the front or rear. Hitherto, in apparatus of this description, the generator has always been opened at one end and in front, and the assistant, when filling, is greatly in the way of the operator, who is at work in front of the apparatus. I also propose to provide the generators with waste-valves $l$ in the rear, similar in position and construction to those, $m\ m$, shown in front, as is usually the case. This arrangement will permit of either filling or discharging any generator from the rear or the front. The sediment-traps and dry purifiers may be made in various ways, and I do not consider myself limited to the precise manner in which they are herein shown, but consider this portion of my invention to consist in the retention of the marble-dust and acidulated water in a receptacle by themselves, and thereby prevent their introduction into any of the liquid purifiers, as has hitherto generally been the case when the latter have been connected with the generators direct.

In the making up of the pipes $a\ a$, leading from the generators to the purifiers B B and their sediment-traps $c\ c$, I have provided round joints, as they have heretofore been made square, and I find in practice that marble-dust collects in those places, and finally materially obstructs the pipes $a\ a$ and prevents ready flow of gas from the generators.

To more effectually break up the globules of gas as they pass through the purifiers A' A' A', I have provided the latter with perforated diaphragms $t'\ t'$, as shown in Fig. 6 of the drawings. These diaphragms are disposed in the purifiers a short distance above the orifice of the inlet-pipes, and are formed with short projecting spurs upon their under side, with ragged or broken orifices. A simple illustration of their formation is to take a sheet of tin, place it upon a soft piece of wood, and punch holes through said sheet. The yielding of the wood allows a burr to be formed upon the under side of the tin plate, while a hole is formed in the end of the spur or projection. In operation these diaphragms are disposed with the smooth side uppermost, and the gas, rising, collects under the plate between the projection formed on its surface, and thence escapes upward through these rough irregular openings and holes into the main body of the purifier, and is thereby effectively broken into small globules.

I claim—

1. In combination, the generators A $A^4$, receivers A' A' A', dry purifiers B B, with their sediment-traps $c\ c$, and purifiers D F G, with their connecting-pipes and the automatic valves C C', substantially as and for the purposes herein described.

2. The combination of the generators A $A^4$, pipes $a\ a$, with their valves, and the sediment-traps and dry purifiers, with the pipes $d$ and $f$, connecting with the purifier D, as described, and the purifiers F G, with the receivers A' A' A', substantially as described.

3. In a carbonic-acid-gas-generating apparatus, a generator provided both front and back with filling-bungs and discharging-valves $j\ k\ l\ m$, as and for purposes herein set forth.

4. A purifier having an air-inlet pipe in its side, an outlet-pipe in its top, and a diaphragm extending down from its top between said pipes, to compel the air entering by the former pipe to descend to the bottom of the purifier before ascending to the outlet.

In testimony whereof I affix my signature in presence of two witnesses.

LUTHER WINTHROP PUFFER.

Witnesses:
A. F. HAYDEN,
H. E. LODGE.